United States Patent
Danielson et al.

[11] Patent Number: 5,610,107
[45] Date of Patent: Mar. 11, 1997

[54] BLUE HIGH SILICA GLASS

[75] Inventors: Paul S. Danielson, Corning, N.Y.; Sheryl L. Hultman, Martinsburg, W. Va.; Christine C. Wolcott, Horseheads, N.Y.

[73] Assignee: Corning Incorporated, Corning, N.Y.

[21] Appl. No.: 407,126

[22] Filed: Mar. 20, 1995

[51] Int. Cl.$^6$ .................................. C03C 3/06; C03C 1/10
[52] U.S. Cl. .................. 501/54; 501/39; 65/30.13; 65/111
[58] Field of Search .................................. 501/54, 39, 32; 65/30.1

[56] References Cited

U.S. PATENT DOCUMENTS

| | | | |
|---|---|---|---|
| 2,215,039 | 9/1940 | Hood et al. | 501/54 |
| 2,286,275 | 6/1942 | Hood et al. | 501/65 |
| 2,303,756 | 12/1942 | Nordberg et al. | 501/54 |
| 2,340,013 | 1/1944 | Nordberg et al. | 501/54 |
| 2,355,746 | 8/1944 | Nordberg et al. | 501/54 |
| 3,188,217 | 6/1965 | Elmer et al. | 501/54 |
| 3,188,218 | 6/1965 | Elmer et al. | 501/54 |
| 3,258,631 | 6/1966 | Elmer et al. | 313/112 |
| 3,399,043 | 8/1968 | Elmer et al. | 65/30.1 |
| 4,073,579 | 2/1978 | Deeg et al. | 351/169 |
| 5,248,638 | 9/1993 | Elmer et al. | 501/54 |
| 5,300,466 | 4/1994 | Elmer et al. | 501/54 |

OTHER PUBLICATIONS

"Coloured Glasses", by Woldemar A. Weyl, Dawson's of Pall Mall, London, 1959, pp. 168-196.

*Primary Examiner*—Mark L. Bell
*Assistant Examiner*—Louis M. Troilo
*Attorney, Agent, or Firm*—Kees van der Sterre

[57] ABSTRACT

High silica glasses exhibiting blue color by transmitted light are produced by impregnating a porous, high silica glass with a solution of cobalt, aluminum, and selected alkaline earth or alkali salts, and then consolidating the glass under oxidizing conditions to dope the glass with the corresponding oxides. The tinted glass has particular utility as a blue filter for lighting applications.

15 Claims, 1 Drawing Sheet

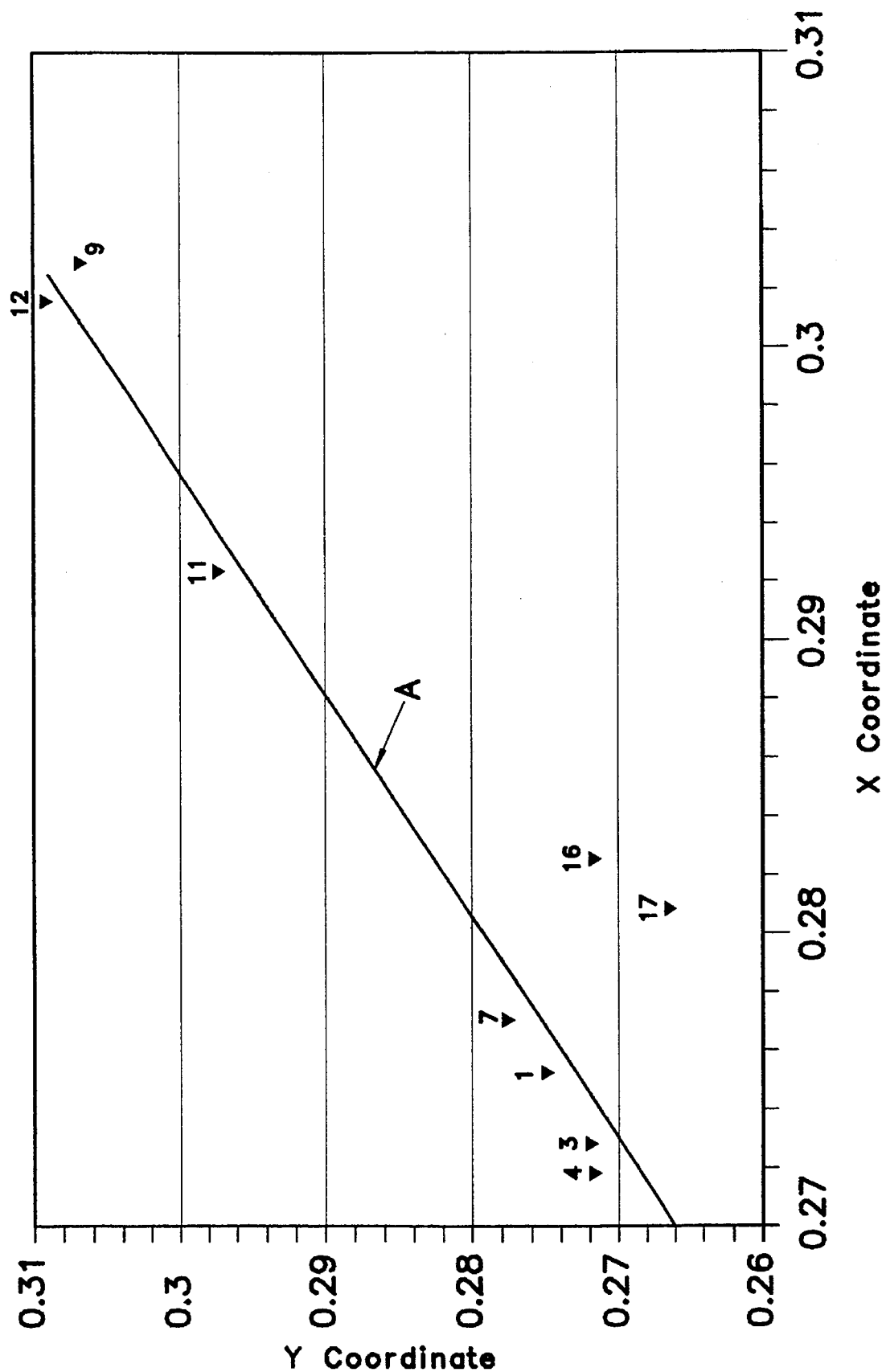

BLUE HIGH SILICA GLASS

BACKGROUND OF THE INVENTION

The present invention relates to light filters and more particularly to doped, high silica glasses for the production of such filters.

High silica glasses are glasses consolidated from a porous state and containing, exclusive of additives, at least about 94% silica. Such glasses, also referred to as reconstructed and 96% silica glasses, are similar to fused silica in their ability to resist softening at high temperatures. Of particular interest for many applications is the fact that high silica glasses have coefficients of thermal expansion (CTEs) on the order of $7-14\times10-7/°$ C. This property renders them resistant to heat shock.

The production of such glasses was first disclosed in U.S. Pat. Nos. 2,215,039 and 2,286,275 (Hood et al.). As there described, such glasses are melted as a precursor, phase-separable, borosilicate glass. This glass is then heat treated to separate the glass into a silica-rich matrix phase and a borate-rich second phase. The latter phase is readily soluble, and may be removed by solution in a mineral acid such as nitric acid. The porous glass matrix that remains is largely silica. It may then be thermally consolidated to produce a non-porous, clear glass of lesser volume and having a silica content of at least 94%.

It was subsequently learned that porous, high silica glasses could be impregnated with solutions containing a variety of different metal salts. These salts convert to oxides during consolidation and produce a modified glass. The production of colored glasses in this manner is taught in U.S. Pat. Nos. 2,303,756, 2,340,013 and 2,355,746 (Nordberg et al.). Among the colors reported is a yellowish-green obtained with a chromium oxide addition.

Patents issued subsequent to the initial development of these processes expanded the range of colors and intensities available. For example, U.S. Pat. No. 3,188,217 (Elmer et al.) produces an amber-colored, color-correcting filter by incorporating a combination of iron, nickel and aluminum oxides in a high silica glass, while U.S. Pat. No. 3,188,218 (Elmer et al.) provides a blue, color-correcting filter by incorporating a combination of $Co_2O_3$, $P_2O_5$ and an alkali metal oxide in a high silica glass.

U.S. Pat. Nos. 3,258,631 and 3,399,043 (Elmer et al.) describe selectively impregnating porous glass tubing from the outside or external surface only. U.S. Pat. No. 4,073,579 (Deeg et al.) produces porous surface layers on ophthalmic lenses and impregnates them with various colorants to produce tinted lenses, although no association of color and colorant is made.

The above colorants and many others have been used to make colored glasses by conventional melting processes, although the colors obtained in melted glasses may differ substantially from those in reconstructed glasses depending upon factors such as the state of oxidation of the glass melt and interactions between colorants and other components of the molten glass. The text "Coloured Glasses", by W. A. Weyl, (1959), for example, describes the use of various chromium, cobalt, copper, iron, neodymium, sulfur, titanium and/or vanadium compounds to produce blue glasses. Chapter XII at pages 168–196 of that text deals particularly with the use of cobalt for the coloring of glass.

It has recently become desirable to provide a glass having a controlled blue color for external automotive lighting. However, with the advent of halide lamps, glasses used in lamp envelopes now must withstand greatly increased service temperatures. Thus ordinary lamp glasses cannot be used. As a consequence, a need has developed for a refractory high silica glass which would exhibit a specifically prescribed blue color.

First considered in addressing this need was the use of cobalt as a dopant for a porous high silica glass. Unfortunately, upon consolidation the resulting glasses exhibited colors more akin to lavender, pink or purple, a result attributed to the presence of red as well as blue color centers in the glass.

Accordingly, it is a basic purpose of the present invention to provide high silica glasses that meet the need for a purer blue glass for color filter applications. Another purpose is to provide a reliable method of developing the desired color in a high silica glass.

SUMMARY OF THE INVENTION

A central aspect of our invention is therefore a high silica glass that exhibits a blue color of improved purity in transmitted light. We have discovered that co-doping porous high-silica glass with cobalt oxide and compounds of certain other metals, particularly with appropriate combinations of aluminum salts and salts of calcium, potassium, barium and/or strontium, gives a purer blue color and better transmission characteristics than porous high-silica glass doped with cobalt compounds alone. Apparently, the selection of these particular metal ions at the right levels assures tetrahedral coordination of divalent cobalt ions with oxygen, giving a purer blue color than is the case when a significant amount of pinkish-purple octahedral cobalt is present.

Another aspect of the invention is a light transmitting filter formed from a high silica glass with at least a portion of the glass containing, as essential additives, oxides of cobalt, aluminum, and at least one other metal selected from the group consisting of calcium, potassium, barium and strontium. This filter exhibits a blue color by transmitted light, due to higher light transmission at 450 nm than at green (580 nm) or red (650 nm) wavelengths.

In a specific embodiment, the filter is a tubular or hollow body having a wall thickness of 1.0–1.5 mm which is composed of a high silica glass containing, as additives, oxides of cobalt, aluminum, and at least one other metal selected from the group consisting of calcium, potassium, barium and/or strontium.

The invention further includes a method of producing a blue-colored, high silica glass wherein a porous, high silica glass is impregnated with a solution of additive oxide precursors and the impregnated, porous glass is thermally consolidated into a solid, impervious glass. The method is characterized by impregnating the porous glass with an aqueous salt solution containing metal oxide precursors such as metal nitrates in proportions equivalent to at least 0.01M cobalt nitrate, 0.1M aluminum nitrate, and 0.2M in nitrates of metals selected from the group consisting of Ca, K, Ba and Sr. Preferably, metal nitrate salts in a nitric acid solution are used, and the impregnated glass is consolidated in an oxidizing atmosphere, which may be a stream of flowing air or oxygen.

BRIEF DESCRIPTION OF THE DRAWING

The drawing consists of a graphical representation of color coordinate values for a number of tinted high silica glasses within and outside of the scope of the invention.

DETAILED DESCRIPTION

In accordance with the present invention a combination of at least three dopants, essentially including cobalt- and aluminum-containing dopants, is used for the development of clear blue coloration in doped porous high silica glasses. Doping high-silica glasses with cobalt and aluminum nitrates alone provides a glass with good clarity, i.e., a glass which is less scattering and higher in transmission than a glass doped with cobalt alone. However the resulting glasses tend toward purple coloration, rather than yielding the desirable pure blue color which tetrahedral cobalt color centers in pure fused silica glasses were thought to provide.

The invention overcomes this problem by utilizing one or more additional co-dopants, together with cobalt and aluminum, to shift the blue color of the glass away from purple hues into the desired range. These co-dopants are selected from the group consisting of calcium, strontium, barium and potassium, with the most successful co-dopant for favoring a purer blue cobalt color being calcium.

Porous high silica glasses suitable for impregnation in accordance with the invention may be derived from essentially any sourced but are preferably prepared by a technique in accordance with that described in U.S. Pat. No. 2,303,756. That technique involves first melting a parent glass article from a selected borosilicate glass, and then thermally treating the article to separate the glass into two phases, one of which is composed essentially of soluble constituents.

The phase-separated article is next leached with a dilute mineral acid to remove the soluble phase, providing a porous high silica structure which is then rinsed in preparation for subsequent impregnation with a solution containing salts or other soluble compounds of the desired metal colorants.

Impregnation can be accomplished using any suitable suspension or solution of compounds of the colorants, but is preferably carried out using aqueous salt solutions. In a particularly preferred procedure, the porous glass article is immersed in a dilute aqueous acidic salt solution containing nitrate salts of the desired metals, the metal concentrations in solution being selected to achieve the level of coloration desired in the final glass.

Following impregnation the glass structure is dried and heat treated to convert the colorant salts to oxides, and to consolidate the glass by closure of the pore structure thereof. Typically, consolidation is carried out in a controlled atmosphere furnace in order to control the oxidation state of the colorants as the pore structure of the glass is being closed.

A specific example of the preparation of a blue filter glass in accordance with a presently preferred embodiment of the invention is as follows.

EXAMPLE

A number of glass plate samples are prepared for impregnation with selected combinations of colorants. These samples are formed of porous 96% silica glass made in accordance with U.S. Pat. Nos. 2,215,039 and 2,286,275 cited above. Each sample is about 2.5 mm by 2.5 mm square and 1.1 mm in thickness. Since organic contamination can interfere with the homogeneity and/or hue of colors developed in these glasses, the samples are preliminarily heated to 650° C. in air for about one hour to remove any contamination.

A 0.1N nitric acid solution of cobalt nitrate, aluminum nitrate, and calcium nitrate is prepared and allowed to stand for in excess of 15 minutes prior to use. This solution contains the co-dopant salts in molar concentrations of about 0.17M $Co(NO_3)_3$, 0.13M $Al(NO_3)_2$, and 0.25M $Ca(NO_3)_2$.

A glass plate sample is selected for impregnation with this solution. After thorough drying to remove all rinse solution from the pores of the glass, the sample is immersed in the nitrate salt solution for two minutes, and then removed.

After immersion, the impregnated sample is washed in aqueous 0.1N $HNO_3$ and then in deionized water to remove excess salt solution from the sample surface, and is then dried at room temperature. This procedure minimizes surface salt deposits which can cause surface devitrification, crazing, or reboil upon consolidation of the impregnated glass.

Consolidation of the pore structure of the glass is carried out by heating the glass in a tube furnace in an atmosphere of dry flowing air. The dried sample is first heated at a rate of about 100° C./hour to 850° C., held for one hour at 850° C., further heated to 1000° C. at a rate of 100° C./hour, and held for an additional hour at 1000° C. This heating removes molecularly-bound water from the pore structure and its contents. Finally, the sample is further heated to 1200° C. at 100° C./hour, and maintained at 1200° C. for 30 minutes to complete the process of pore consolidation. The consolidated sample is then cooled to the vicinity of room temperature at the natural cooling rate of the furnace.

Examination of the sample prepared as described indicates that a clear blue tint has been imparted to the glass. In qualitative terms, the sample can be characterized as exhibiting high light transmittance at 450 nm (blue wavelengths) in combination with relatively low transmittance at both 580 nm (yellow-green) and 650 nm (red) wavelengths.

Quantitative color measurements to determine the C.I.E. color coordinates of the sample of the Example are next made. The C.I.E. trichromatic colorimetric system, documented by A. C. Hardy in the Handbook of Colorimetry, Technology Press, Cambridge, Mass. (1936), permits the color characteristics of any color sample to be uniquely defined by certain color coordinates. Under that system the x and y color coordinates of a light-transmitting sample, which determine hue, and the luminous transmittance value $Y_c$ of the sample when illuminated by a standardized light source, are sufficient to define its color.

Color coordinate data for the glass sample of the Example are shown in the Drawing, which is a colorimetric diagram plotting x and y hue coordinates of a number of samples in a blue-violet region of C.I.E. color space. The Drawing plots the x and y data for the Example (labeled "1" in the Drawing) together with a number of other cobalt-impregnated tinted glasses provided as hereinafter described.

In the diagram of the Drawing, x color coordinate values are shown on the x-axis and y coordinate values on the y-axis. The pure blue glass of the above Example had color coordinates x=0.2756 and y=0.2750, and had a luminous transmittance value $Y_c$=53.7%, all values as determined using C.I.E. standardized light source Illuminant C.

Tables I and II below set out composition and colorimetric data for the above Example and a number of additional tinted 96% silica glass samples. Some of the glasses have been tinted to pure blue color in accordance with the invention and others are comparative examples outside of the scope of the invention.

All of the samples reported in the Tables were prepared following the procedure of the Example above, but with different combinations of doping salts being present in the solutions used to impregnate the porous glasses. Doping of all of the glasses was carried out using aqueous 0.1N $HNO_3$ cobalt nitrate solutions which incorporated preselected concentrations of aluminum, calcium, barium, strontium and/or potassium nitrates co-dopants as shown in Table I. All concentrations are reported as molar salt concentrations in each of the solutions.

TABLE I

| | Compositions | | | | | |
|---|---|---|---|---|---|---|
| Sample No. | Co $(NO_3)_2$ | Al $(NO_3)_2$ | Ca $(No_3)_2$ | Ba $(NO_3)_2$ | Sr $(NO_3)_2$ | $KNO_3$ |
| 1 | 0.17M | 0.13M | 0.25M | | | |
| 2 | 0.17M | 0.13M | 0.5M | | | |
| 3 | 0.17M | 0.27M | 0.25M | | | |
| 4 | 0.17M | 0.27M | 0.5M | | | |
| 5 | 0.17M | 0.13M | | | | 0.25M |
| 6 | 0.17M | 0.13M | | | 0.25M | |
| 7 | 0.17M | 0.13M | | 0.25M | | |
| 8 | 0.085M | 0.065M | 0.13M | | | |
| 9 | 0.034M | 0.026M | 0.05M | | | |
| 10 | 0.17M | 0.13M | 0.25M | | | |
| 11 | 0.085M | 0.13M | 0.25M | | | |
| 12 | 0.034M | 0.13M | 0.25M | | | |
| | Comparative Examples | | | | | |
| 13 | 0.17M | | | | | |
| 14 | 0.17M | | 0.25M | | | |
| 15 | 0.17M | | 0.5M | | | |
| 16 | 0.17M | 0.13M | | | | |
| 17 | 0.17M | 0.27M | | | | |
| 18 | 0.17M | | | | | 0.25M |
| 19 | 0.17M | | | | 0.25M | |
| 20 | 0.17M | | | 0.25M | | |

The results of colorimetric measurements on the consolidated samples described in Table I above are reported in Table II below. Included in Table II where determined on individual samples are C.I.E. transmittance data for hue coordinates x and y and for luminous transmittance values $Y_c$, all as determined on 1 mm thick samples using Illuminant C. Also reported are transmittance data for selected samples at 450 nm (blue), 580 nm (yellow-green), and 650 nm (red) wavelengths, reported in percent transmission (%T) values as recorded by a Varian CARY 210 recording spectrophotometer.

TABLE II

| | Optical Properties | | | | | |
|---|---|---|---|---|---|---|
| Sample No. | x | y | $Y_c$ | % T 450 nm | % T 580 nm | % T 650 nm |
| 1 | 0.2756 | 0.275 | 53.7 | 76.7 | 45.4 | 51.9 |
| 2 | 0.2753 | 0.276 | 51.1 | 71 | 40.5 | 43.8 |
| 3 | 0.275 | 0.2738 | 52.5 | 74.8 | 42.1 | 49.7 |
| 4 | 0.2721 | 0.2723 | 52.7 | 75.9 | 41.5 | 44.8 |
| 5 | 0.2801 | 0.2773 | 53.8 | 73.7 | 42.8 | 53.4 |
| 6 | 0.2717 | 0.2725 | 52.2 | 75.7 | 42.4 | 45 |
| 7 | 0.2769 | 0.2773 | 53.1 | 73.9 | 43.6 | 49.6 |
| 8 | 0.2938 | 0.2953 | 69.7 | | | |
| 9 | 0.3046 | 0.3071 | 82 | | | |
| 10 | 0.2737 | 0.2729 | 51.4 | | | |
| 11 | 0.2934 | 0.2977 | 71.4 | | | |
| 12 | 0.3038 | 0.3096 | 83.4 | | | |
| | Comparative Examples | | | | | |
| 13 | 0.273 | 0.2615 | 42.9 | 53.1 | 49.8 | 78.5 |
| 14 | 0.285 | 0.2881 | 40.9 | 52.2 | 34.4 | 40 |
| 15 | 0.2885 | 0.2931 | 38 | 44.3 | 30.1 | 34.2 |
| 16 | 0.2833 | 0.2723 | 54.1 | 76.5 | 44.5 | 64 |
| 17 | 0.2812 | 0.267 | 51 | 75.4 | 42.2 | 63 |
| 18 | 0.286 | 0.2869 | 52.7 | 66.4 | 43.1 | 49.5 |
| 19 | 0.2822 | 0.2873 | 39.2 | 48.2 | 30.4 | 33.2 |
| 20 | 0.2945 | 0.3011 | 48.3 | 53.5 | 40.2 | 44.8 |

The predominant blue tint of most of the glasses reported in Table II is qualitatively reflected in the relatively high blue (450 nm) transmittances and relatively low green (580 nm) and red (650 nm) transmittances of the samples shown. Generally, the tinted high silica glasses of the invention will have light transmittances in 1 mm thickness of at least 68% at 450 nm, but below 50% at 580 nm, and below 55% at 650 nm.

The color and transmission requirements for particularly preferred blue tinted glasses for automotive and related applications can be quantitatively defined in terms of the C.I.E. colorimetric characteristics reported in Table II. Firsts the glasses should exhibit overall luminous transmittance values $Y_c$, as determined under Illuminant C through samples of 1 mm thickness, in the range of about 50–85%. Transmittances above about 85% are too lightly tinted for effective filtering, while values below 50% can filter too much light from the light sources customarily used.

Secondly, the glasses should have x and y color coordinates (under Illuminant C) which place them in the predominantly blue rather than lavender or pink region of C.I.E. color space. Our observations suggest that adequate blue purity will be achieved if the y hue coordinate value for the glass is above a "boundary" line joining the (x,y) points (0.2700,0.2640) and (0.3050,0.3100) on the C.I.E. colorimetric diagram.

Color coordinate data for selected representative glasses from Table II above are plotted in the Drawing. The point labels in the Drawing correspond to Sample numbers in Tables I and II. Also plotted in the Drawing is the "boundary" line (designated A in the Drawing) showing the location of the demarcation between colors having the best blue purity (which fall above the line) and colors having an increased red component. Glasses exhibiting the latter colors (i.e., falling below the line) tend to appear more lavender, violet or pink in transmitted light.

Visual examination of Samples 1, 2, 3 and 4 from the Tables indicate that these glasses have the purest blue colors. These glasses simultaneously meet the requirements of adequate luminous transmittance and acceptable hue.

The hue coordinates of Samples 1 and 4 are shown in the drawing. Sample 1 is a particularly preferred composition since it requires only half the Ca doping of sample 2, but has nearly the same color. In some applications it is desirable to use the minimum effective dopant levels to avoid accompanying lowering of the softening and strain points of the consolidated colored glass.

Samples 13, 16, and 17 from Table I contain no calcium or other color balancing dopant. The result, reflected by the locations of Samples 16 and 17 in the Drawing, is that the glasses exhibit higher 650 nm (red) transmission and fall well below line A marking the borderline of desirable coloration.

Samples 13, 14 and 15 contain no aluminum. Thus, even though Samples 14 and 15 exhibit acceptable color, all three samples exhibit low luminous transmittance values, i.e., values below the desired minimum of 50%.

Additional examples in the Tables show the use of other color-balancing co-dopants to minimize the lavender/pink coloration attributable to octahedral cobalt in these doped glasses. As seen in Samples 5, 6 and 7, the use of K, Sr and Ba nitrates is clearly effective to reduce red transmission when used at molar ratios equivalent to those in the calcium nitrate solutions. Sample 7 containing barium and plotted in the Drawing, is representative.

The presence of an aluminum co-dopant in these alternative systems remains an important factor to control luminous transmittance. Samples 18, 19 and 20 had no aluminum co-dopant, and the latter two samples thus had markedly lower luminous transmittance than Samples 5–7. These latter glasses are equivalent in Al and alkali/alkaline earth metal doping to Ca-doped Sample 1, and similar in transmittance. The alkaline earths appear to be more effective than potassium in reducing red coloration, and are therefore preferred. We found that adding bivalent Zn as a nitrate co-dopant was substantially ineffective for this purpose.

For some lighting applications the 0.17 molar Co solutions used for many of the transmission samples shown in the Tables may yield too intense a color. However, simply diluting the dopant mixture to give lower calcium and aluminum as well as lower Co concentrations, as in Samples 8 and 9, hindered the ability to suppress the transmission in the red, and gave light lavender colors. Sample 9 plotted in the Drawing is representative. For this reason, keeping Ca and Al levels fixed while decreasing the Co concentration as needed for the desired color saturation, as illustrated in Samples 11 and 12 shown in the Drawing, gives the purest light blue color.

Certain minimum concentrations of the selected nitrate salts in the doping solutions are required to yield the desired blue color in sufficient saturation in these high silica glasses. For porous glasses of the type used in the Example, these minima are about 0.01M Co $(NO_3)_3$, 0.1M $Al(NO_3)_3$, and 0.2M in nitrates selected from the group consisting of $Ca(NO_3)_2$, $Sr(NO_3)_2$, $Ba(NO_3)_3$, and $KNO_3$. For optimum glass quality, color intensity and hue the ratios of nitrate salts in these solutions will be selected to provide, for each 1 mole of cobalt nitrate, about 0.8–10 moles, more preferably 0.8–2 moles, of aluminum nitrate and 1–20 moles, more preferably 1–3 moles, total of the nitrates of calcium, barium, strontium and potassium.

Corresponding minimum oxide concentrations of the selected dopants in clear glass, applicable to these and other clear porous silicate glasses amenable to treatment in accordance with the invention, would be at least about 0.014% (140 ppm) $Co_2O_3$, 0.1% $Al_2O_3$, and 0.4% total of oxides selected from the group consisting of CaO, SrO, BaO and $K_2O$. Concentration ranges of dopants for achieving the desired luminous transmittance and pure tint in a consolidated silicate glass are, as analyzed in weight percent on the oxide basis, about 0.014–0.24% $Co_2O_3$, 0.1–0.3% $Al_2O_3$, and 0.4–1% total of oxides selected from the group consisting of CaO, SrO, BaO and $K_2O$, most preferably CaO. The preferred high silica host glasses for these dopant concentrations will contain at least 95% silica by weight.

The use of the dopant combination of cobalt, aluminum, and calcium in these glasses is particularly preferred for a number of reasons. First, less calcium nitrate (on a weight basis) is required for the same level of effect (equal molar solutions) than would be needed if strontium or barium nitrate were used. Calcium-doped glasses were also less likely to develop cracking defects after drying and firing than potassium-doped glasses, perhaps because of the higher tendency toward salt migration of the potassium salts used. And, calcium salts are generally less expensive than salts of either strontium or barium.

We claim:

1. A high silica glass exhibiting a blue color by transmitted light that contains, as essential components in individual amounts below 1% by weight, the oxides of cobalt, aluminum, and at least one oxide selected from the group consisting of calcium, strontium, barium and potassium, and wherein the cobalt is predominantly present in tetrahedral coordination with oxygen.

2. A high silica glass in accordance with claim 1 which contains, in weight percent, at least about 0.014% $Co_2O_3$, 0.1% $Al_2O_3$, and 0.4% total of oxides selected from the group consisting of CaO, SrO, BaO and $K_2O$.

3. A high silica glass in accordance with claim 1 which contains, as analyzed in weight percent on the oxide basis, about 0.014–0.24% $Co_2O_3$, 0.1–0.3% $Al_2O_3$, 0.4–1% total of oxides selected from the group consisting of CaO, SrO, BaO and $K_2O$, and at least 95% silica.

4. A high silica glass in accordance with claim 2 which contains the oxides of cobalts aluminum, and calcium.

5. A high silica glass in accordance with claim 1 which has a light transmittance in 1 mm thickness of at least 68% at 450 nm, below 50% at 580 nm, and below 55% at 650 nm.

6. A high silica glass in accordance with claim 1 which has a luminous transmittance ($Y_c$) of about 50–85% and x,y color coordinates such that the y coordinate values are above a line joining the (x,y) points (0.2700,0.2640) and (0.3050, 3100) on the C.I.E. colorimetric diagram.

7. A light transmitting filter formed from a high silica glass, at least a portion of the glass containing as essential additives, oxides of cobalt, aluminum, and at least on oxide selected from the group consisting of calcium, strontium, barium and potassium, the filter exhibiting a light transmittance in 1 mm thickness of at least 68% at 450 nm, below 50% at 580 nm, and below 55% at 650 nm.

8. A filter in accordance with claim 7 which has a luminous transmittance ($Y_c$) of about 50–85%.

9. A filter in accordance with claim 8 wherein the glass contains in weight percent on the oxide basis, about 0.014–0.24% $Co_2O_3$, 0.1–0.3% $Al_2O_3$, 0.4–1% total of oxides selected from the group consisting of CaO, SrO, BaO and $K_2O$, and at least 95% silica.

10. A filter in accordance with claim 7 in the form of a tubular or hollow body having a wall thickness of 1.0–1.5 mm.

11. A method of producing a high silica glass exhibiting a blue color by transmitted light comprising the steps of:
(i) impregnating a porous, high silica glass with a solution of additive oxide precursors of cobalt oxide, aluminum oxide, and at least one oxide selected from the group consisting of calcium oxide, strontium oxide, barium oxide and potassium oxide wherein the cobalt is predominantly present in tetrahedral coordination with oxygen. and
(ii) thermally consolidating the impregnated, porous glass to a solid non-porous blue tinted glass containing the above additive oxides in individual amounts below 1% by weight.

12. A method in accordance with claim 11 wherein the solution of additive oxide precursors is a nitrate salt solution containing nitrate oxide precursors in concentrations of at least about 0.01M Co $(NO_3)_3$, 0.1M $Al(NO_3)_3$, and 0.2M in nitrates selected from the group consisting of $Ca(NO_3)_2$, $Sr(NO_3)_2$, $Ba(NO_3)_3$, and $KNO_3$.

13. A method in accordance with claim 11 wherein the additive oxide precursors are nitrates present in mole ratios providing, for each mole of cobalt nitrate, about 0.8–10 moles of aluminum nitrate and 1–20 moles total of the nitrates of calcium, barium, strontium and potassium.

14. A method in accordance with claim 11 wherein the solution of additive oxide precursors is a weak nitric acid solution.

15. A method in accordance with claim 10 wherein the impregnated porous glass is thermally consolidated in an oxidizing atmosphere.

* * * * *